United States Patent [19]

Blomqvist et al.

[11] Patent Number: 5,360,498

[45] Date of Patent: Nov. 1, 1994

[54] APPARATUS FOR SEALING BY SURFACE FUSION OF MUTUALLY FACING SURFACES OF THERMOPLASTIC MATERIALS OR COATINGS, AND THE USE OF A GIANT MAGNETOSTRICTIVE POWDER COMPOSITE FOR THIS PURPOSE

[75] Inventors: Peter Blomqvist, Lund; Ingmar Andreasson, Eslöv; Magnus Råbe, Lund; Gyula Balla, Malmö; Tord Cedell, Lund, all of Sweden

[73] Assignee: Tetra Laval Holdings & Finance SA, Pully, Switzerland

[21] Appl. No.: 49,429

[22] Filed: Apr. 21, 1993

[30] Foreign Application Priority Data

Apr. 23, 1992 [SE] Sweden ............................. 9201280-6

[51] Int. Cl.⁵ .......................................... B32B 31/16
[52] U.S. Cl. .................. 156/73.1; 156/580.2; 156/379.6; 156/272.2; 219/633; 228/1.1
[58] Field of Search .............. 219/10.53, 10.73, 10.75, 219/633; 228/110, 1.1, 2; 156/73.1, 73.2, 73.5, 73.6, 272.2, 379.6, 580.2

[56] References Cited

U.S. PATENT DOCUMENTS

| | | | |
|---|---|---|---|
| 3,787,258 | 1/1974 | Takahashi et al. | 156/73 |
| 3,791,028 | 2/1974 | Missel | 228/1 |
| 3,864,186 | 2/1975 | Balla | 156/272 |
| 3,920,503 | 11/1975 | Keeler | 156/580 |
| 4,060,443 | 11/1977 | Balla | 156/380 |
| 4,120,712 | 10/1978 | Sindt | 219/10.53 |
| 4,237,181 | 12/1980 | Tanabe et al. | 156/73.1 |
| 4,371,768 | 2/1983 | Pozna | 219/10.53 |
| 4,606,786 | 8/1986 | Andersson | 156/580.1 |
| 4,747,894 | 5/1988 | Johnston et al. | 156/73.1 |
| 4,818,313 | 4/1989 | Sundberg | 156/64 |
| 4,818,322 | 4/1989 | Morino et al. | 156/272.8 |

*Primary Examiner*—Philip H. Leung
*Attorney, Agent, or Firm*—Burns, Doane, Swecker & Mathis

[57] ABSTRACT

An apparatus for ultrasonic sealing of thermoplastic materials includes a vibration generator of a so-called giant magnetostrictive powder composite (GMPC) which is anchored to a jaw at an anchorage point. The vibration generator is formed with a cross-sectional area which progressively reduces as seen from the anchorage point. A free end of the vibration generator has a narrow working surface. The vibration generator is surrounded by a coil for generating a magnetic field.

21 Claims, 3 Drawing Sheets

APPARATUS FOR SEALING BY SURFACE FUSION OF MUTUALLY FACING SURFACES OF THERMOPLASTIC MATERIALS OR COATINGS, AND THE USE OF A GIANT MAGNETOSTRICTIVE POWDER COMPOSITE FOR THIS PURPOSE

TECHNICAL FIELD

The present invention relates to an apparatus for sealing by surface fusion of mutually facing surfaces of thermoplastic material or coatings for the purpose of forming and/or sealing packaging containers, and the use of a body of giant magnetostrictive powder material for generating the mechanical ultrasonic oscillations required for carrying out the sealing operation.

BACKGROUND ART

It has long been known in packaging technology to employ, as packaging material, thermoplastic material or materials provided with thermoplastic coatings. The advantage with these materials (which, for example, may consist of polyolefins such as polythene, polypropylene but also other types of thermoplastic materials), is that they can easily be sealed or fused to one another in a tight and durable seal by surface fusion of the materials, which is achieved in that the materials are heated to their melting temperature, whereafter they are compressed at the same time as heat is dissipated and the thus formed sealing seams or joints are allowed to stabilize.

For example, it is common in the production of single use disposable packages for drinks such as milk, fruit juice etc., to employ a packaging material consisting of a base or core layer of paper or board, the base layer displaying on each side coatings of thermoplastic material, preferably polyethylene. The production of these packaging containers normally takes place with the aid of previously produced blanks or with the aid of a web reeled off from a magazine or jumbo reel. In many cases, the packaging container is produced by fold forming of the material and by heat sealing of surface portions laid together in the fold forming operation in order, by such means, to retain the shape of the package created by the folding operation. After filling of the packaging container, the container can be liquid-tight sealed by means of heat sealing.

Normally, this heat sealing is carried into effect by means of thermal energy which is supplied through heated sealing jaws, or with the aid of heat generated in the packaging material, for example by the induction of eddy currents along the desired sealing area in a metal foil layer specifically provided in the packaging laminate. In this latter case, the heat is generated in the metal foil layer and thereafter led from the metal foil layer to adjacent thermoplastic layers, which are heated to melting temperature for the purposes of surface fusion with adjacent thermoplastic layers.

One form of generation of sealing heat on the sealing of packages is to employ ultrasonic sound. In ultrasonic welding, the material is affected by a mechanically oscillating tool which is generally designated a horn, the tool operating against a back-up surface which is normally entitled an anvil. The materials intended for sealing are accommodated between the horn and the anvil and the heat requisite for the sealing or welding occurs as a result of friction in those parts of the thermoplastic material which are exposed to the friction processing. The processing frequency is not immediately critical but must, nevertheless, be so high that the heating time does not become excessively long and, in practice, the processing frequency employed in the friction welding must be above the audibility range, since otherwise the discomfort caused by noise pollution would be considerable. Thus, it is possible to carry out friction welding at a frequency within the audible range, but for practical reasons this is not applied and, as a result, this particular technology has been entitled ultrasonic welding.

Those apparatuses which are available today for heat sealing or welding thermoplastic materials with the aid of ultrasonic vibration require, in addition to an oscillating body transferring the vibrations, the so-called horn, also an oscillation generator connected to the horn and often an interjacent adaptor for transferring the vibrations from the vibration generator to the horn. The commonest method of generating the oscillations is to employ piezoelectric crystals which are disposed in a stack or battery. These crystals are energized with current from an electric high frequency generator at suitable supply frequency, i.e., approx. 20 kHz. The vibrations generated in the crystal stack are transferred via a transferring device, a so-called booster, to the oscillator or the horn which, when it is brought into contact with the material which is to be fused, generates friction losses in the contact surface and internally in the material, which is heated to the melting point. The inconvenience inherent in the prior art apparatuses is that they are bulky and require space, since each of the interconnected parts must be of a certain length. The design and length of the horn itself is determined by the frequency at which the horn is to operate and the height of the crystal stack is determined by the amplitude or vibration effect with which it is intended to operate. In addition to the fact that prior art ultrasonic sealing or welding apparatuses take up considerable space, they are also of large mass, which is a disadvantage given that they must be movable to be brought into engagement with the sealing object. A further drawback is that the prior art ultrasonic sealing apparatuses are expensive.

SUMMARY OF THE INVENTION

The above-outlined drawbacks can be obviated with the aid of a sealing apparatus according to the present invention which is characterized in that it includes a vibration generator which consists of a body of giant magnetostrictive powder composite (GMPC) secured in a movable jaw, the body having been processed so as to have, seen from its anchorage point in the jaw, progressively reducing cross sectional area, and whose free, working surface opposing the anchorage point is long and narrow, of a width which substantially corresponds to the width of the desired seal; that the above-mentioned body is surrounded by or itself houses a coil for generating a magnetic field, the coil being connectible to a current source for emitting an electric alternating current of a frequency exceeding 7,500 Hz.

The use of so-called giant magnetostrictive material, which fundamentally consists of an alloy between one or more metals within the group of "rare earth metals" and one or more metals within the group comprising Fe, Ni, Co and Mn, has not previously been possible in a vibration generator for sealing purposes because the material is extremely brittle and has no capability to absorb tensile stresses. Furthermore, the material which is normally cast in rod form because of its brittleness, is difficult to process in order to be given appropriate shape for a sealing jaw. These drawbacks have been obviated as a result of a patent-pending invention which fundamentally entails that powder of magnetostrictive or giant magnetostrictive material is pressed together with an electrically insulating binder to form a pliable composite so that, in principle, the individual powder grains of the magnetostrictive material are isolated from one another in that there is formed an insulating layer around each grain and that reinforcement of fiber type is compressed together with the grains for forming a magnetostrictive powder composite (GMPC) so as to increase mechanical strength against tensile stresses and possibly achieve an internal pretensioning in the material.

BRIEF DESCRIPTION OF THE ACCOMPANYING DRAWINGS

One embodiment of the apparatus according to the present invention will be described in greater detail hereinbelow, with particular reference to the accompanying schematic Drawings, in which.

Figure 3A:
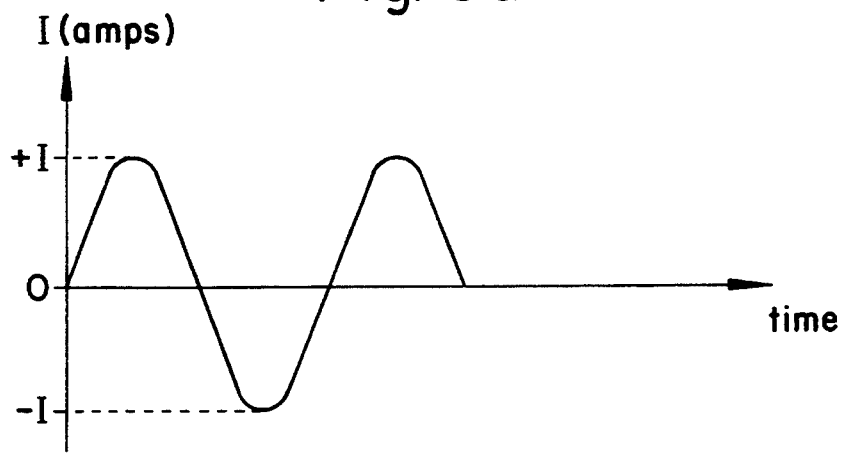
Figure 3B:
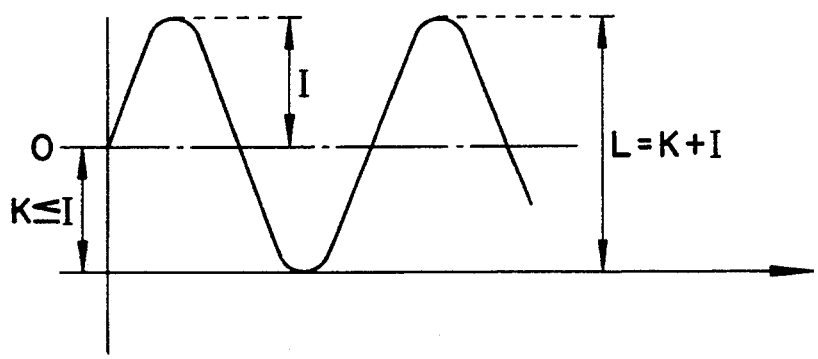
Figure 3C:
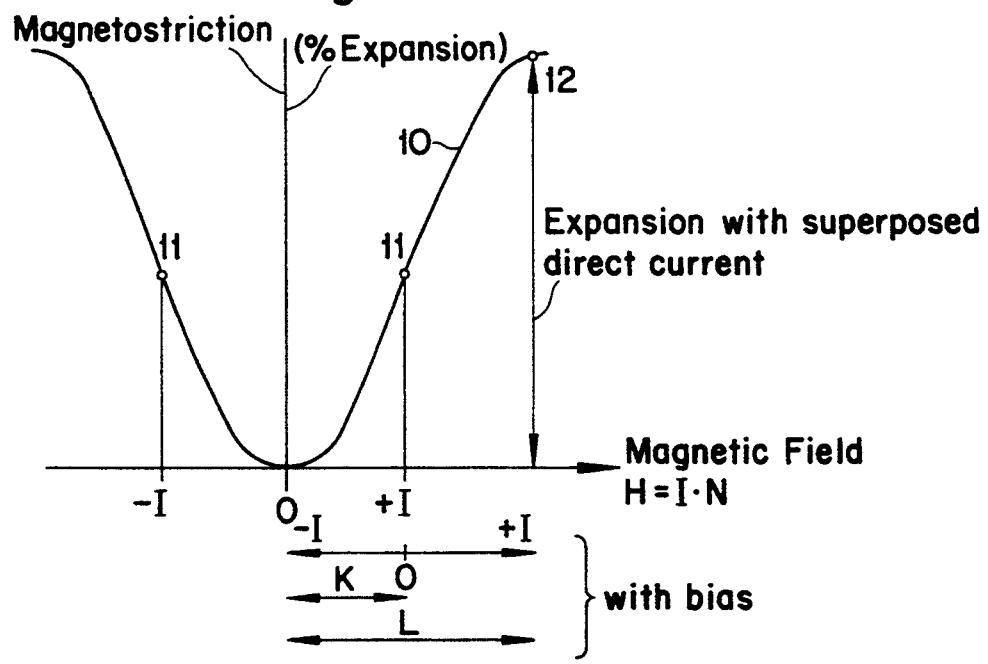
Figure 4:
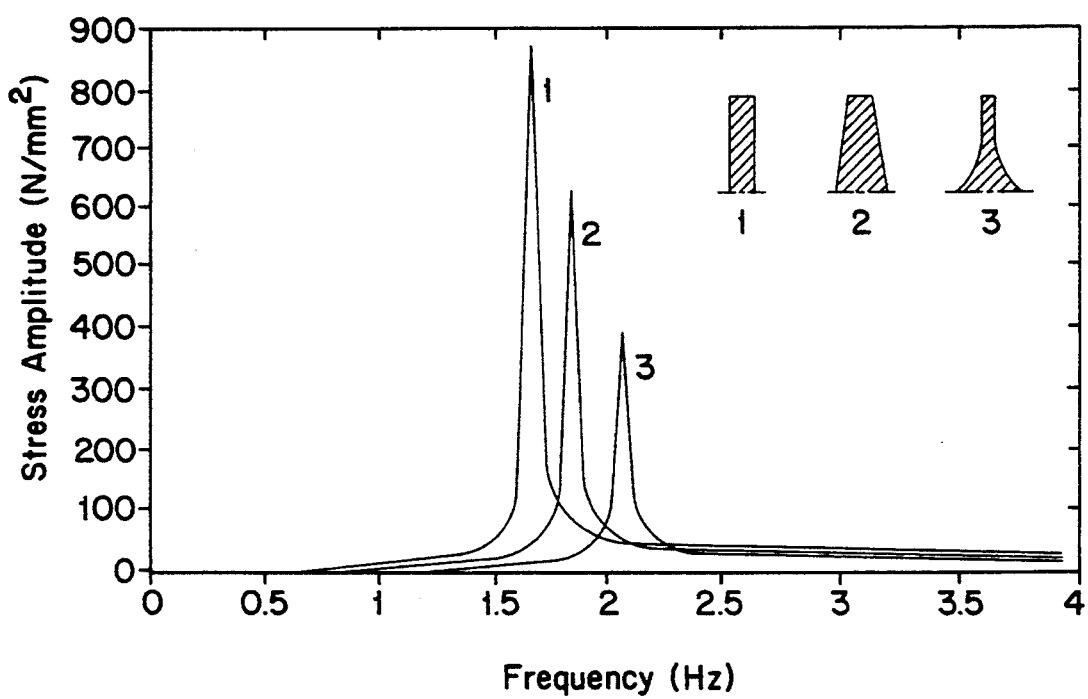

FIGS. 3 a, b and c show graphically the difference between direct magnetization of the vibration generator with alternating current and so-called bias magnetization using a direct current superposed on the alternating current; and FIG. 4 graphically illustrates how the mechanical tension in the magnetostrictive material, like the resonance frequency in the oscillating body, varies with the supply frequency of the electrical supply current.

DESCRIPTION OF PREFERRED EMBODIMENT

Figure 1:
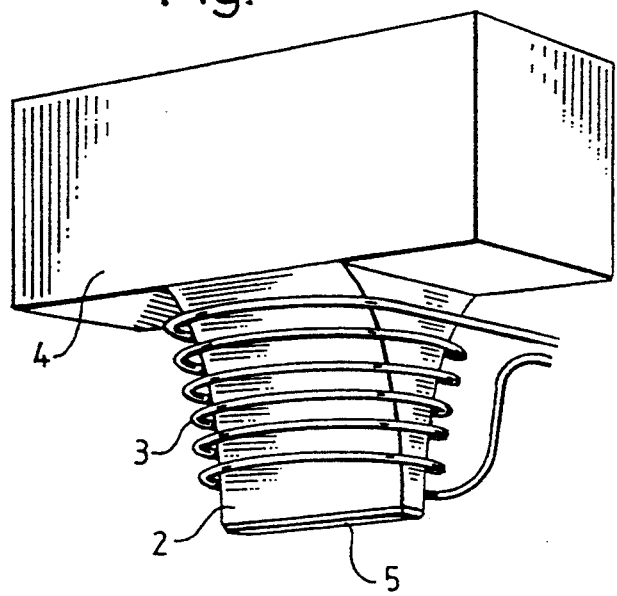
FIG. 1 is a schematic, perspective view of an embodiment of a sealing jaw according to the present invention.

The sealing jaw I according to the present invention is schematically illustrated in FIG. 1 and it consists of an oscillation body 2 of a giant magnetostrictive powder composite (GMPC) produced from, for example, such magnetostrictive material as is marketed under the brand name TERFENOL. A coil 3 is wound around the oscillation body 2 and is connected to a source of alternating current (not shown) adapted to generate an alternating current of a frequency of between 7.5 kHz and 50 kHz. The oscillation body 2 is secured in a jaw 4 of large mass in relation to the mass of the body 2. The above-mentioned jaw 4 may consist of steel or similar material and the body 2 may suitably be secured to the jaw 4 by means of gluing or other suitable method.

An electromagnetostrictive material is characterized in that it undergoes dimensional alteration when magnetized and, in the example according to FIG. 1, a coil 3 for generating a magnetic field is connected around the oscillation body 2. If this coil 3 is energized with an alternating current, the oscillation body 2 will, in response to the variations of the current, be expanded and contracted, which entails that it is possible, with the oscillation body 2, to generate mechanical oscillations which can be employed for several purposes. The purpose which is relevant in the case under consideration here is to realize seals between laid-together thermoplastic material according to a method which is per se well known in the art, namely of generating heat in the thermoplastic layers intended for sealing by an inner friction which is created with the aid of vibrations. Since this operation is generally carried out at a vibration frequency which lies above the human audibility range, i.e., above approx. 20 kHz, this type of seal is often referred to as "ultrasonic sealing".

Figure 2:
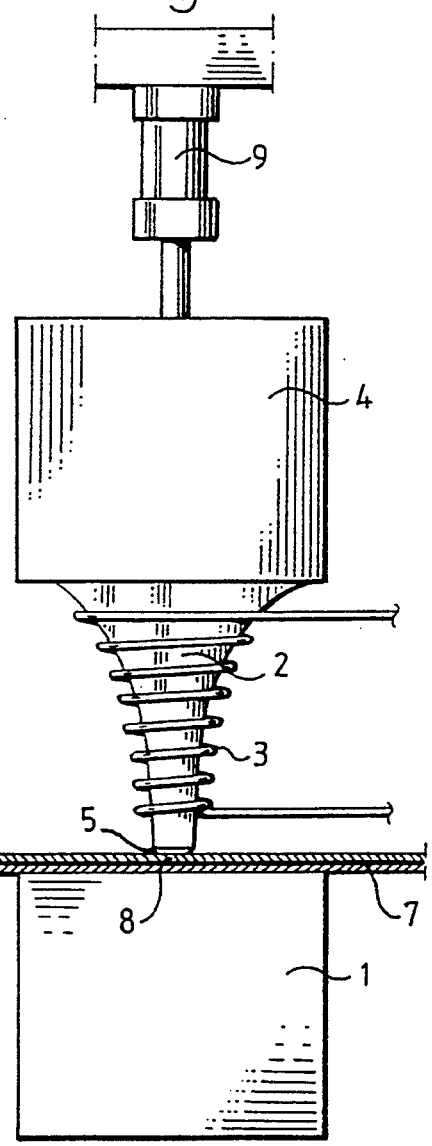
FIG. 2 is a schematic, perspective view of an embodiment of the apparatus according to the present invention on sealing of laid together packaging material layers.

The oscillation body 2 which is secured in the jaw 4 is of a cross-sectional area which progressively reduces towards it free end. The principle is that, as a result of its design, a natural frequency will be imparted to the oscillation body which agrees with the supply frequency of the current led through the coil 3. In one prototype which has been manufactured, the height of the oscillation body is no more than 40 min. The above-disclosed design with progressively reducing cross-sectional area affords an elevated resonance frequency in the body 2 and at the same time reduces the tension amplitude at the anchorage which is important, since otherwise the oscillation body 2 might easily come loose from its anchorage in the jaw 4. The free working surface 5 of the oscillation body 2 can preferably be coated with a durable steel coating to which is imparted a profiled, preferably rounded surface, with a view to creating linear contact between the working surface 5 of the oscillation body 2 and the material intended for sealing, when the sealing apparatus is brought into engagement with the material. As the material softens as a result of the heat generation, the contact surface between the oscillation body 2 and the material will progressively increase as the profiled working surface 5 is pressed down into the material in the sealing zone. FIG. 2 shows how the described apparatus is brought into contact with two layers of packaging material 6 which have mutually facing thermoplastic surfaces 7 in contact with one another. The material layers 6 are disposed between a back-up surface or an anvil I which is of large mass (i.e., is not itself set in oscillation by the movements of the oscillation body 2) and the work surface 5 of the oscillation body 2. The sealing jaw 4 may advantageously be connected to a compressed air cylinder 9 with whose help it can be moved to an inactive position where the oscillation body 2 is not in contact with the substrate intended for sealing, and an active position where the oscillation body 2 is urged against the material 6 intended for sealing and is urged against this material at a sealing pressure suitable for the sealing operation. FIG. 3 a shows a diagram of the sinusoidal alternating current with which the coil 3 is supplied. The extreme values, i.e., the amplitude of the current are +1 and −1 respectively and the current whose value has been set as a function of time symmetrically oscillates about a zero line which symbolises the current value 0.

If the coil 3 is supplied with this "pure" alternating current, the oscillation body 2 will be magnetized and expand twice per complete period of the alternating current, i.e., an expansion of the magnetostrictive oscillation body 2 will be obtained twice each complete period. If the supply frequency of the current is then F, the frequency of the oscillation body will be 2×F. This entails that, given an oscillation frequency of the oscillation body 2 of approx. 20 kHz, a supply frequency of the current through the coil 3 of approx. 10 kHz must be selected.

FIG. 3b shows, in diagram form, the same sinusoidal curve for the current, but in which the alternating current of an amplitude of 1 has a superposed dc voltage component K which is equal to or larger than 1. This implies that the alternating current of an amplitude I oscillates around an "artificial zero line" which has a positive potential. The peak amplitude L of the current is equal to K+1.

Since the current reaches its peak amplitude only once per period and does not reach negative potential, the magnetostrictive oscillation body 2 will be altered in length only once per period, which entails that the vibration frequency of the oscillation body 2 will agree with the supply frequency of the current. This type of magnetization is called bias magnetization.

The same phenomenon as illustrated in FIGS. 3 $a$ and 3 $b$ may be described with the aid of FIG. 3 $c$ which shows a curve 10 indicating the longitudinal expansion in a rod of magnetostrictive material when this is exposed to a magnetic field. In the diagram, the longitudinal expansion of the magnetostrictive material is set along the y axis, while the magnetic field H influencing then material has been set along the x axis. The magnetic field H equals I x N, i.e., the current force through the coil 3 multiplied by the number of coil turns in the coil, while the longitudinal expansion is normally measured in percentage or per mille of the length of the magnetostrictive material.

If the coil 3 is fed with a "pure" alternating current which varies around a 0 position, the magnetostrictive body 2 will expand twice each whole current period. If, on the other hand, a direct current which is equal to or larger than the amplitude I of the alternating current is superposed on the alternating current, only one expansion 12 takes place per whole period of the alternating current, as is apparent from the Figure. FIG. 3 $c$ also shows that the mechanical oscillation amplitude of the vibration-generating body 2 will be greater when the bias method is employed than if pure alternating current is utilized for generating the magnetic field which magnetizes the body 2.

It has previously been mentioned that the natural frequency of the oscillation body 2 is influenced by its appearance. The amplitude of those forces with which the oscillation body is activated at the anchorage in the jaw is also influenced by the appearance of the oscillation body. FIG. 4 presents a schematic diagram of oscillation bodies which have been given different cross-sections. In the first case, the oscillation body has been given a rectangular cross-section, in the second case a slightly bevelled cross-section and, in the third case, a successively tapering configuration towards its free end. As is apparent from the diagram, the shape of the body influences not only the resonance frequency but also the "stress amplitude" at the point of anchorage. Since it is difficult to secure a magnetostrictive composite material of the type contemplated here with the aid of conventional fixing methods such as screw connections or welding, the most suitable method is to glue the oscillation body 2 to the surface of the jaw 4. This entails that the stresses in the contact region must be kept as slight as possible in order to prevent the glue connection from breaking. There are also other advantages in choosing a progressively tapering oscillation body, among other things that the working surface will be relatively narrow and concentrated, which is necessary in order that the generated and transferred energy be able, in a short time, to result in a weld or fusion.

In one practical experiment which has been conducted with an apparatus according to FIG. 2, bias magnetization was employed using an alternating current amplitude of 16 A and a "bias current" of 20 A in the employment of coil with 70 turns. The height of the oscillation body 2 was 40 mm and the resonance frequency 23.5±0.5 kHz. The pressure with which the oscillation body 2 was forced against the substrate was 12±4 N/mm$^2$ and the welding time was 0.3 to 0.5 seconds.

The compression pressure is important since it has a certain effect on the resonance frequency. In the related case, the resonance frequency with unloaded oscillation generator was approx. 21 kHz, but the resonance frequency rose to 23.5 kHz when the oscillation body 2 was urged against the packaging material.

The employment of an oscillation generator which has been produced from magnetostrictive composite material affords many advantages. Not only will the dimensions of the sealing jaw be small (which gives major practical advantages such as reduced costs for the packaging machine), but also the sealing unit proper will be considerably cheaper to produce.

The present invention should not be considered as restricted to that described above and shown on the Drawings, many modifications being conceivable without departing from the spirit and scope of the appended claims.

What is claimed is:

1. An apparatus for sealing thermoplastic surfaces to one another, comprising:
   a body formed of giant magnetostrictive powder composite (GMPC), the body being adapted to be secured to a jaw at an anchorage point of the body, the body having a free working surface at an end of the body opposite the anchorage point, the body having a cross-sectional area that progressively reduces in relation to proximity to the working surface; and
   electric coil means for generating a magnetic field, the electric coil means surrounding the body.

2. The apparatus as set forth in claim 1, wherein the working surface is linear.

3. The apparatus as set forth in claim 1, wherein the working surface is curved.

4. The apparatus as set forth in claim 1, wherein the working surface is a closed curve.

5. The apparatus as set forth in claim 1, wherein the working surface includes a surface formed of steel.

6. The apparatus as set forth in claim 1, further comprising an anvil, at least one of the anvil and the working surface being displaceable relative to one another.

7. The apparatus as set forth inc claim 6, wherein at least one of the anvil and the working surface includes a rounded surface for abutment against material to be sealed.

8. The apparatus as set forth in claim 6, wherein the working surface is displaceable relative to the anvil between a first, inactive position in which the working surface is not urged against the anvil, and a second, active position in which the working surface is adapted to contact and, with the anvil, compress material to be sealed disposed between the working surface and the anvil.

9. The apparatus as set forth in claim 1, further comprising means, connected to the coil, for emitting an electric current.

10. The apparatus as set forth in claim 9, wherein the electric current emitting means emits alternating current at a frequency of 7500 Hz or greater.

11. The apparatus as set forth in claim 9, wherein the electric current emitting means further emits direct current.

12. The apparatus as set forth in claim 11, wherein the electric current emitting means emits direct current such that the current does not reach negative potential.

13. The apparatus as set forth in claim 1, wherein the body tapers linearly from a largest cross-section at the anchorage point to a smallest cross-section at the working surface.

14. The apparatus as set forth in claim 1, wherein the body tapers curvedly from a largest cross-section at the anchorage point to a smallest cross-section at the working surface.

15. A method for sealing thermoplastic surfaces to one another, comprising the steps of:
   placing a pair of sheets, each having at least one thermoplastic surface, adjacent one another such that a thermoplastic surface of one sheet is in contact with a thermoplastic surface of the other sheet;
   moving a body formed of giant magnetostrictive powder composite (GMPC) into contact with one of the sheets, the body being adapted to be secured to a jaw at an anchorage point f the body, the body having a free working surface at an end of the body opposite the anchorage point; and
   providing alternating current through a coil surrounding at least a portion of the body so that the body vibrates at a frequency corresponding to the frequency of the alternating current, the vibration of the body generating heat for sealing together the facing thermoplastic surfaces.

16. The method as set forth in claim 15, comprising the further step of providing direct current through the coil.

17. The method as set forth in claim 16, wherein the direct current is provided such that the current does not reach negative potential.

18. The method as set forth in claim 15, comprising the further step of providing direct current such that the frequency of vibration of the body is equal to one half of the frequency of the alternating current.

19. An apparatus for sealing thermoplastic surfaces to one another, comprising:
   an anvil;
   a sealing jaw;
   power means for moving the sealing jaw toward and away from the anvil;
   the sealing jaw having an oscillation body secured to the jaw and extending toward the anvil, the body being formed of giant magnetostrictive powder composite (GMPC) and having a working surface spaced from the sealing jaw, the body having a cross-sectional area that progressively reduces in relation to proximity to the working surface; and
   electric coil means on the body for generating vibration in the working surface, the vibration having a frequency greater than 20 kHz,
   whereby sheets of thermoplastic material placed between the anvil and the working surface are heat sealed together.

20. The apparatus as set forth in claim 19, wherein the body is secured to the jaw with an adhesive.

21. An apparatus for sealing thermoplastic surfaces to one another, comprising:
   a body formed of giant magnetostrictive powder composite (GMPC), the body being adapted to be secured to a jaw at an anchorage point of the body, the body having a free working surface at an end of the body opposite the anchorage point, the body having a cross-sectional area that progressively reduces in relation to proximity to the working surface; and
   electric coil means for generating a magnetic field, the electric coil means being housed in the body.

* * * * *